(12) United States Patent
Rothman et al.

(10) Patent No.: US 8,516,092 B2
(45) Date of Patent: Aug. 20, 2013

(54) METHOD AND SYSTEM FOR PROVIDING KEYBOARD, VIDEO, AND MOUSE SWITCHING

(75) Inventors: Michael A. Rothman, Puyallup, WA (US); Vincent J. Zimmer, Federal Way, WA (US); Yasser Rasheed, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 1215 days.

(21) Appl. No.: 11/966,098

(22) Filed: Dec. 28, 2007

(65) Prior Publication Data

US 2009/0172698 A1 Jul. 2, 2009

(51) Int. Cl.
*G06F 15/173* (2006.01)

(52) U.S. Cl.
USPC .............................. 709/222; 713/2; 719/317

(58) Field of Classification Search
USPC .............................. 709/222; 713/2; 719/317
See application file for complete search history.

(56) References Cited

U.S. PATENT DOCUMENTS

| | | | | |
|---|---|---|---|---|
| 6,438,640 | B1 * | 8/2002 | Miyamoto et al. | 710/303 |
| 7,032,108 | B2 * | 4/2006 | Maynard et al. | 713/2 |
| 7,114,066 | B1 * | 9/2006 | Swaminathan | 713/1 |
| 2003/0084133 | A1 * | 5/2003 | Chan et al. | 709/222 |
| 2005/0081084 | A1 * | 4/2005 | Lai et al. | 714/4 |
| 2005/0210232 | A1 * | 9/2005 | Hsu | 713/2 |
| 2006/0218255 | A1 * | 9/2006 | Chan et al. | 709/220 |
| 2007/0208891 | A1 * | 9/2007 | Liu | 710/62 |
| 2009/0055157 | A1 * | 2/2009 | Soffer | 703/27 |

OTHER PUBLICATIONS

Rothman, Michael A., et al., "Providing Keyboard, Video, Mouse Switching via Software", U.S. Appl. No. 11/728,859, filed Mar. 27, 2007. 13 pages.

* cited by examiner

*Primary Examiner* — Thomas Dailey
(74) *Attorney, Agent, or Firm* — Barnes & Thornburg LLP

(57) ABSTRACT

A method and system for providing keyboard, video, and mouse switching includes establishing a basic input/output system (BIOS) agent and an operating system (OS) agent on a server of a plurality of servers. The basic input/output system agent routes input/output data between the server and a remote keyboard, remote video device, and/or remote mouse over a network during a pre-boot phase of the server. The operating system agent routes input/output data between the server and the remote keyboard, remote video device, and/or remote mouse over the network during a runtime phase of the server. The basic input/output agent may pass data to the operating system agent to indicate that a communication connection has been established between the server and the remote keyboard, remote video device, and/or remote mouse.

15 Claims, 4 Drawing Sheets

METHOD AND SYSTEM FOR PROVIDING KEYBOARD, VIDEO, AND MOUSE SWITCHING

BACKGROUND

A typical keyboard, video, mouse switch (KVM switch) is a hardware device usable to selectably direct keyboard inputs, video outputs, and mouse inputs to one of a plurality of computing devices. For example, in a sever farm including a large number of servers, a single keyboard, display, and mouse may be used to control or otherwise communicate with each server via use of a keyboard, video, mouse switch. Because the keyboard, video, mouse switch allows a single keyboard, display, and mouse to be used, a separate keyboard, video, and mouse need not be directly coupled to each of the servers, thereby reducing the cost of managing the server farm. However, conventional hardware keyboard, video, mouse switches are generally expensive.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION OF THE DRAWINGS

Figure 1:
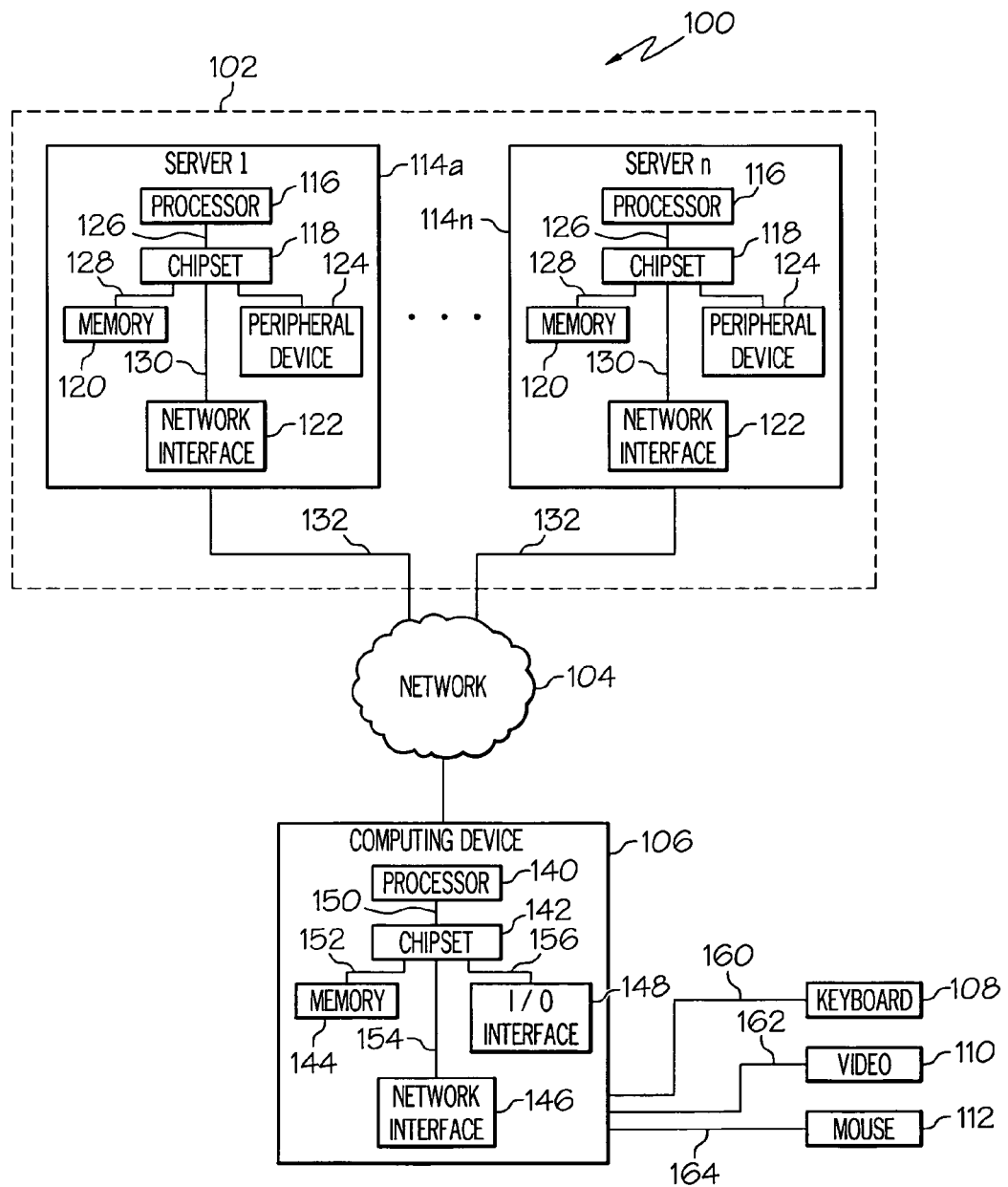
FIG. 1 is a simplified block diagram of one embodiment of a system for providing keyboard, video, mouse switching.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present disclosure. It will be appreciated, however, by one skilled in the art that embodiments of the disclosure may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; and others.

Referring now to FIG. 1, a system 100 for providing keyboard, video, and mouse (KVM) switching includes a network of servers 102, a communication network 104, a processor-based computing device 106, a remote keyboard 108, a remote video device 110, and a remote mouse 112. The network of servers 102 includes a plurality of servers 114a-114n, which may form a server farm. The servers 114 may be embodied as stand-alone servers, blade servers, or the like. Each of the servers 114 includes a processor 116, a chipset 118, memory 120, and a network interface 122. Additionally, in some embodiments, each of the servers 114 may include one or more peripheral devices 124 such as internal hard drives. The processor 116 illustratively includes a single processor core (not shown). However, in other embodiments, the processor 116 may be embodied as a multi-core processor having any number of processor cores. Additionally, each server 114 may include additional processors having one or more processor cores in other embodiments.

The processor 116 is communicatively coupled to the chipset 118 via a number of signal paths 126. The signal paths 126 may be embodied as any type of signal paths capable of facilitating communication between the processor 116 and the chipset 118. For example, the signal paths 126 may be embodied as any number of wires, printed circuit board traces, vias, bus, intervening devices, and/or the like. The chipset 118 is communicatively coupled to a memory device 120 via a number of signal paths 128. Again, similar to the signal paths 126, the signal paths 128 may be embodied as any type of signal paths capable of facilitating communication between the chipset 118 and the memory device 120 such as, for example, any number of wires, printed circuit board traces, vias, bus, intervening devices, and/or the like. The memory device 120 may be embodied as dynamic random access memory devices (DRAM), synchronous dynamic random access memory devices (SDRAM), double-data rate dynamic random access memory device (DDR SDRAM), and/or other volatile memory devices. Additionally, although only a single memory device is illustrated in FIG. 1, in other embodiments, the server 114 may include additional memory devices.

The chipset 118 is also communicatively coupled to the network interface 122 via a number of signal paths 130. Again, similar to the signal paths 126, 128, the signal paths 130 may be embodied as any type of signal paths capable of facilitating communication between the chipset 118 and the network interface 122. The network interface 122 may include a number of devices, firmware, and other structures to facilitate communication between the server 114 and the keyboard 108, video device 110, and/or mouse 112 over the network 104. In other embodiments, the computing device 100 may include additional or other peripheral devices depending upon, for example, the intended use of the computing device. Further, it should be appreciated that the computing device 100 may include other components, sub-components, and devices not illustrated in FIG. 1 for clarity of the description. For example, it should be appreciated that the chipset 118 may include a memory controller hub (MCH) or northbridge, an input/output controller hub (ICH) or southbridge, a firmware memory device, and other components.

Each of the servers 114 are communicatively coupled to the network 104 via a number of signal paths 132, which may be embodied as any number of wires, cables, and/or other interconnects. The network 104 may be embodied as or otherwise include any type of communication network such as, for example, a local area network (LAN), a wide area network (WAN), and/or a publicly-accessible global network such as the Internet. Additionally, the network 104 may be embodied as or otherwise include a wired network and/or a wireless network. As such, the network 104 may include a number of devices, structures, and software for facilitating data communication. For example, the network 104 may include a plurality of computers or computing devices, bridges, switches, routers, modems, wires, cables, and/or other devices for providing data communications between the servers 114 and the remote keyboard 108, video device 110, and mouse 112.

The computing device 106 may be embodied as any type of processor-based computing device capable of facilitating communication across the network 104 such as, for example, a personal digital assistant (PDA) or the like. In one illustrative embodiment, the computing device 106 includes a processor 140, a chipset 142, memory 144, a network interface 146, and an input/output interface 148. The processor 140 may be a single-core or multi-core processor having a plurality of processor cores. Additionally, in some embodiments, the computing device 106 may have more than one processor, each of which may include a plurality of processor cores.

The processor 140 is communicatively coupled to the chipset 142 via a number of signal paths 150. The signal paths 150 may be embodied as any type of signal paths capable of facilitating communication between the processor 140 and the chipset 140, such as any number of wires, printed circuit board traces, vias, bus, intervening devices, and/or the like. The chipset 142 is communicatively coupled to a memory device 144 via a number of signal paths 152. The chipset 142 is also communicatively coupled to the network interface 146 via a number of signal paths 154 and to the input/output interface 148 via a number of signal paths 156. Similar to the signal paths 150, the signal paths 152, 154, 156 may be embodied as any type of signal paths capable of facilitating communication between the chipset 142 and the memory device 120, the network interface 146, and the input/output interface 148, respectively. For example, the signal paths 152, 154, 156 may be embodied as any number of wires, printed circuit board traces, vias, bus, intervening devices, and/or the like.

The memory device 120 may be embodied as dynamic random access memory devices (DRAM), synchronous dynamic random access memory devices (SDRAM), double-data rate dynamic random access memory device (DDR SDRAM), and/or other volatile memory devices. Additionally, although only a single memory device is illustrated in FIG. 1, in other embodiments, the computing device 106 may include additional memory devices. The network interface 146 may include a number of devices, firmware, and other structures to facilitate communication between the keyboard 108, video device 110, and/or mouse 112 and the network of servers 102 over the network 104. Similarly, the input/output interface 148 may include a number of devices, firmware, software, and/or other structures to facilitate the coupling of the keyboard 108, video device 110, and/or mouse 112 to the computing device 106.

As discussed above, the keyboard 108, video device 110, and mouse 112 are communicatively couplable to any one of the servers 114 via the computing device 106 and network 104. That is, each of the servers 114 does not include an individual keyboard, display, and mouse. Rather the single keyboard 108, video device 110, and mouse 112 are used to control a selectable one of the servers 114 as discussed in more detail below. Because the keyboard 108, video device 110, and mouse 112 are communicatively coupled to the network of servers 102 via the network 104, the keyboard 108, video device 110, and mouse 112 may be located remotely from the servers 114. For example, the keyboard 108, video device 110, and mouse 112 may be located in a separate room, building, or site from the network of servers 102. The keyboard 108 may be embodied as any type of keyboard couplable to the computing device 106 via signal paths 160. Similarly, the display device 110 may be embodied as any type of display device couplable to the computing device 106 via signal paths 162. Additionally, the mouse 112 may be embodied as any type of mouse or other pointing device coupleable to the computing device 106 via signal paths 164.

Although the system 100 includes the computing device 106 as an intermediary device between the remote keyboard 108, video device 110, and mouse 112 in the illustrative embodiment, the computing device 106 may not be used in other embodiments. In some embodiments, components of the computing device 106 may be included in or otherwise internal to one or more of the keyboard 108, video device 110, and mouse 112. For example, in some embodiments, the keyboard 108 may include a processor and network interface such that the keyboard 108 may be communicatively coupled directly to the network 104 without the use of the computing device 106.

In use, the keyboard 108, video device 110, and/or mouse 112 may be used to control or otherwise communicate with any one of the servers 114. That is, a single keyboard 108, a single video device 110, and a single mouse 112 may be used with the plurality of servers 114. To do so, the computing device 106 converts (e.g., packetizes) communication data from the keyboard 108 and mouse for transmission across the network 104 to the selected server 114. After receiving the communication data, the server 114 un-converts (e.g., un-packetizes) the communication data and processes the data accordingly. Similarly, the selected server 114 converts (e.g., packetizes) display data generated by the server 114 for transmission across the network 104 to the computing device 106. After receiving the display data, the computing device 106 un-converts (un-packetizes) the display data for displaying on the display device 110. In this way, the keyboard 108, video device 110, and/or mouse 112 may communicate with the any one of the servers 114.

Figure 2:
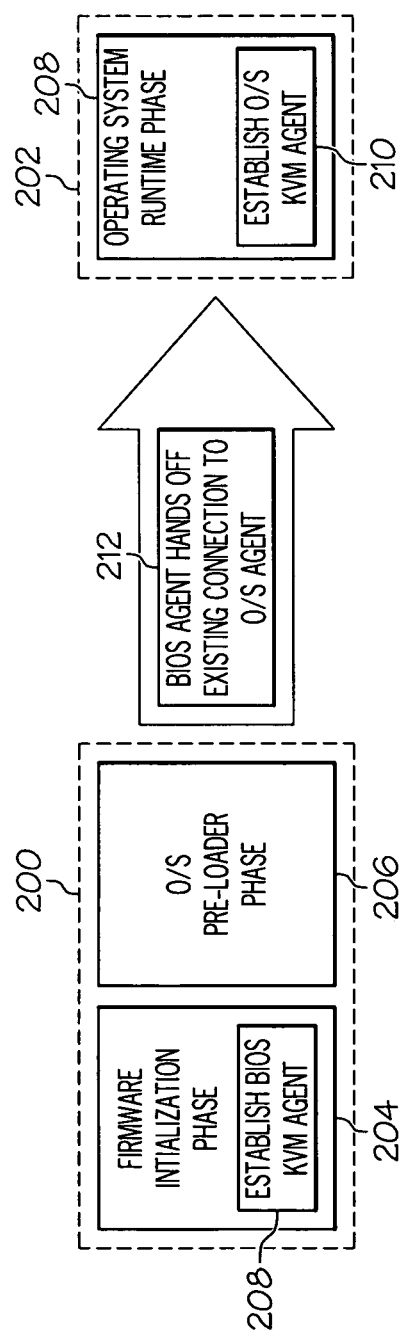
FIG. 2 is a simplified block diagram of the boot-up process of a server of the system of FIG. 1.

Referring now FIG. 2, to facilitate communication with the remote keyboard 108, video device 110, and/or mouse 112, each of the servers 114 execute or otherwise progress through a boot phase 200 and a runtime phase 202 during boot-up, such as after a reset. The boot phase 200 includes a firmware initialization phase 204 and an operating system pre-loader phase 206. During the firmware initialization phase 204, the server 114 establishes a basic input/output system (BIOS) agent 208. The agent 208 may be embodied as, for example, a basic input/output system driver, which is loaded and executed during the firmware initialization phase 204. The agent 208 may establish software hooks to monitor for input data transmitted across the network 104 and directed to the particular server 114. Additionally, the agent 208 may convert output data (e.g., display data) generated by the particular server 114 for transmission across the network to the computing device 106 for display on the display device 110. For example, the agent 208 may be configured to un-packetize input data received from the computing device 106 across the network 104 and/or packetize output data for transmission to the computing device 106 across the network 104. The agent 208 may convert, packetize, or otherwise prepare the output data using any communication protocol such as, for example, transport communication protocol/internet protocol (TCP/IP).

The runtime phase 202 includes an operating system runtime phase 208 during which one or more operating systems are executed on the server 114. During the runtime phase 208, the server 114 establishes an operating system agent 210. The agent 210 may be embodied as, for example, an operating system driver, which is loaded and executed ruing the runtime phase 202. The agent 210 may be similar to the agent 208 and may establish software hooks to monitor for input data transmitted across the network 104 and directed to the particular server 114. Additionally, the agent 210 may convert output data (e.g., display data) generated by the particular server 114 for transmission across the network to the computing device 106 for display on the display device 110.

If a communication connection between the keyboard 108, the video device 110, and/or the mouse 112 and the server 114 is established by the basic input/output system agent 208 during the pre-boot phase 200, the basic input/output system agent 208 is configured or designed to "hand off" the connection to the operating system agent 210. That is, the basic input/output system agent 208 may transfer data to the operating system agent 210 to indicate that a communication connection has been established and that such connection should continue during the runtime phase 202. Additionally, the basic input/output system agent 208 may transfer data indicative of the identity of the computing device 106, the keyboard 108, the video device 110, and/or the mouse 112. For example, the basic input/output system agent 208 may transfer the internet protocol (IP) address of the computing device 106 to the operating system agent 210. The basic input/output system agent 208 may transfer data to the operating system agent 210 by, for example, storing data in a reserved memory location, setting a software flag to indicate the existence of the communication connection, and/or the like.

Figure 3:
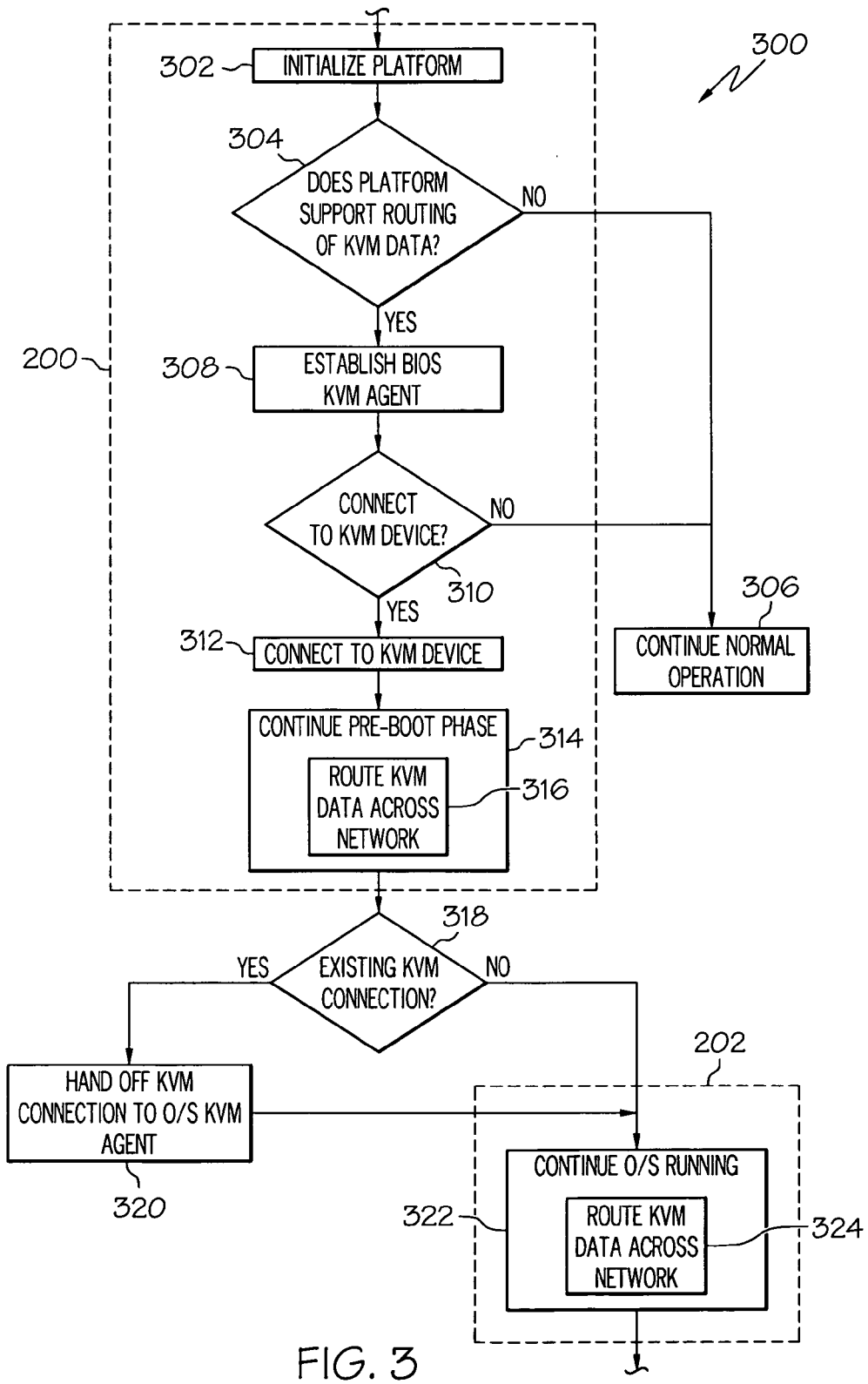
FIG. 3 is a simplified flow diagram of one embodiment of a process for providing keyboard, video, mouse switching.
Figure 4:
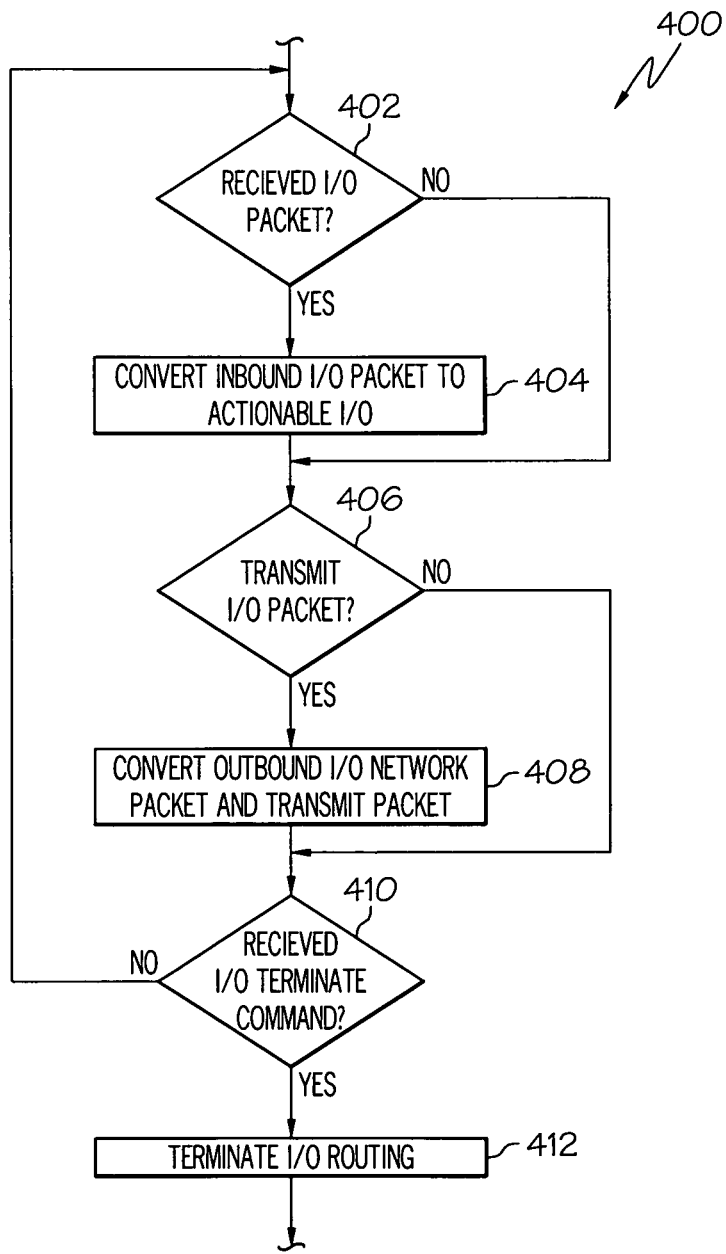
FIG. 4 is simplified flow diagram of one embodiment of a sub-process of the process of FIG. 3.

Referring now to FIGS. 3 and 4, in some embodiments, each of the servers 114 may execute an algorithm 300 to facilitate communication with the remote keyboard 108, video device 110, and/or mouse 112. As discussed above, each of the servers 114 executes a pre-boot phase 200 and a runtime phase 202, which are indicated in FIG. 3 via dashed lines. The algorithm 300 begins with block 302 in which the platform of the server 114 is initialized. For example, memory locations and other devices may be initialized in block 302. In block 304, it is determined whether the platform of the server 114 supports keyboard, video, mouse (KVM) switching. If not, the server 114 continues normal booting and operation in block 306. However, if the platform of the server 114 does support keyboard, video, mouse switching, the basic input/output system (BIOS) agent 208 is established in block 308. As discussed above, the basic input/output system agent 208 may be embodied as a software driver or the like.

In block 310, the server 114 determines whether a connection between the server 114 and the remote keyboard 108, video device 110, and/or mouse 112 should be established. If not, the server 114 continues with standard booting and operating in block 306. However, if the server 114 is to connect to the remote keyboard 108, video device 110, and/or mouse 112, a communication connection between the server 114 and the remote keyboard 108, video device 110, and/or mouse 112 (i.e., between the server 114 and the computing device 106 in the embodiment illustrated in FIG. 1) is established in block 312. In block 314, the server 114 continues the pre-boot phase during which additional initialization procedures are performed. In addition, during the remainder of the pre-boot phase, the basic input/output system agent 208 routes input/output data between the server 114 and the remote keyboard 108, video device 110, and/or mouse 112.

To do so, as illustrated in FIG. 4, the server 114 may execute an algorithm 400 for routing input/output data between the server 114 and the remote keyboard 108, video device 110, and/or mouse 112 and the remote keyboard 108, video device 110, and/or mouse 112. The algorithm 400 begins with block 402 in which it is determined if an input/output packet has been received by the server 114. That is, basic input/output agent 208 (or the operating system agent 210 in block 324 described below) monitors for input data (relative to the server 114) transmitted across the network 104, and directed to the particular server 114, by the computing device 106. If input data has been received by the server 114, the inbound input/output data is converted or otherwise un-packetized to actionable input/output data. The server 114 may then process the actionable input/output data as if the data was supplied by a keyboard or mouse directly connected to the particular server 114.

In block 406, it is determined if an input/output packet is to be transmitted by the server 114. If so, the basic input/output agent 208 or the operating system agent 210 in block 324 described below) converts or otherwise packetizes the output data form the server 114 and transmits the input/output data to the computing device 106 via the network 104 in block 408. In response, the computing device 106 converts or un-packetizes the input/output data for display on the video device 110 or other use.

In block 410, the server 114 determines if an input/output terminate command has been received. The input/output terminate command may be generated by and received form the computing device 106. If so, the input/output routing from the selected server 114 is terminated in block 412. The user of the system 100 may then establish a communication connection with a another server 114 of the plurality of servers. In this way, a single keyboard 110, video device 112, and mouse 114 may be used to control and communicate with each of the plurality of servers 114.

Referring back to FIG. 3, after the server 114 has completed the pre-boot phase 200 or otherwise prior to the runtime phase 202, it is determined whether a communication connection between the server 114 and the remote keyboard 108, video device 110, and/or mouse 112 has been established and should continue during the runtime phase 202 in block 318. If so, the basic input/output system agent 208 "hands off" the communication connection to the operating system agent 210 in block 320. The operating system agent 210 may be established, executed, or otherwise loaded to receive the communication connection. As discussed above, the basic input/output system agent 208 may transfer data to the operating system agent 210 indicating that a communication connection has been established and should continue. Additionally, the basic input/output system agent 208 may transfer data indicative of the identify of the computing device 106, the keyboard 108, the video device 110, and/or the mouse 112 such as a internet protocol (IP) address.

In block 322, the server 114 continues the execution of the operating system. If the operating system agent 210 has not yet been established, the operating system agent 210 is loaded in block 322. In addition, during the remainder of the runtime phase 202, the operating system agent 210 routes input/output data between the server 114 and the remote keyboard 108, video device 110, and/or mouse 112. To do so, the server 114 may execute an algorithm similar to the algorithm 400 illustrated in and described above in regard to FIG. 4.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

What is claimed is:

1. A method comprising:
   establishing a basic input/output system (BIOS) agent on a server of a plurality of servers;
   routing input/output data between the server and at least of one of a remote keyboard, remote video device, and remote mouse over a network during a pre-boot phase of the server via the BIOS agent;
   establishing an operating system (OS) agent, different from the BIOS agent, on the server;
   setting, with the BIOS agent, a software flag that, when set, indicates that: (i) a communication connection between the server and the at least one of the remote keyboard, remote video device, and remote mouse has been established and (ii) the communication connection between the server and the at least one of the remote keyboard, remote video device, and remote mouse is to be continued during a runtime phase of the server;
   reading, with the OS agent, the software flag; and
   routing, in response to the software flag being set, input/output data between the server and the at least one of the remote keyboard, remote video device, and remote mouse over the network during the runtime phase of the server via the OS agent.

2. The method of claim 1, wherein establishing a basic input/output system agent comprises executing a basic input/output system driver to route input/output data between the server and the at least one of the remote keyboard, remote video device, and remote mouse over the network during the pre-boot phase of the server.

3. The method of claim 1, wherein establishing an operating system agent comprises executing an operating system driver to route input/output data between the server and the at least one of the remote keyboard, remote video device, and remote mouse over the network during the runtime phase of the server.

4. The method of claim 1, wherein routing input/output data between the server and the at least one of the remote keyboard, remote video device, and remote mouse comprises packetizing the input/output data for transmission over the network in response to the input/output data being output data from the server.

5. The method of claim 1, wherein routing input/output data between the server and the at least one of the remote keyboard, remote video device, and remote mouse comprises un-packetizing the input/output data in response to the input/output data being input data to the server.

6. The method of claim 5, further comprising processing the input/output data.

7. The method of claim 1, wherein routing input/output data between the server and the at least one of the remote keyboard, remote video device, and remote mouse comprises trapping the input/output data and processing the input/output data.

8. The method of claim 1, further comprising using a single keyboard to control at least two servers of the plurality of servers.

9. The method of claim 1, further comprising using a single mouse to access at least two servers of the plurality of servers.

10. The method of claim 1, further comprising using a single video output for at least two servers of the plurality of servers.

11. The method of claim 1, wherein routing the input/output data between the server and the at least one of the remote keyboard, remote video device, and remote mouse comprises identifying an Internet Protocol address of the at least one remote keyboard, remote video device, and remote mouse.

12. A non-transitory, machine readable medium comprising a plurality of instructions, that in response to being executed, result in a computing device:
    establishing a basic input/output system (BIOS) agent on a server of a plurality of servers to route input/output data between the server and at least of one of a remote keyboard, remote video device, and remote mouse over a network during a pre-boot phase of the server;
    establishing an operating system (OS) agent, different from the BIOS agent, on the server;
    setting, with the BIOS agent, a software flag that, when set, indicates that: (i) a communication connection between the server and the at least one of the remote keyboard, remote video device, and remote mouse has been established and (ii) the communication connection between the server and the at least one of the remote keyboard, remote video device, and remote mouse is to be continued during a runtime phase of the server;
    reading, with the OS agent, the software flag; and
    routing, in response to the software flag being set, input/output data between the server and the at least one of the remote keyboard, remote video device, and remote mouse over the network during the runtime phase of the server.

13. The non-transitory, machine readable medium of claim 12, wherein the basic input/output system agent and the operating system agent route the input/output data by packetizing the input/output data for transmission over the network in response to the input/output data being output data from the server.

14. The non-transitory, machine readable medium of claim 12, wherein the basic input/output system agent and the operating system agent route un-packetizing the input/output data in response to the input/output data being input data to the server.

15. A server comprising:
    a network interface;
    a processor; and
    a memory device having stored therein a plurality of instructions, which when executed by the processor, cause the processor to:

(i) execute a basic input/output system (BIOS) driver to route input/output data between the server and at least of one of a remote keyboard, remote video device, and remote mouse over a network via the network interface during a pre-boot phase of the server;
(ii) execute an operating system (OS) driver, different from the BIOS driver;
(iii) store, with the BIOS agent, data in a reserved memory location to indicate a communication connection between the server and the at least one of the remote keyboard, remote video device, and remote mouse has been established and the communication connection between the server and the at least one of the remote keyboard, remote video device, and remote mouse is to be continued during a runtime phase of the server;
(iv) read, with the OS agent, the data stored in the reserved memory location; and
(v) route, in response to the data read from the reserved memory location, input/output data between the server and the at least one of the remote keyboard, remote video device, and remote mouse over the network via the network interface during a runtime phase of the server.

\* \* \* \* \*